United States Patent [19]

Sabatella et al.

[11] 4,203,146
[45] May 13, 1980

[54] MULTIPLE METERING PANELBOARD ASSEMBLY

[75] Inventors: Robert J. Sabatella; Andre J. M'Sadoques, both of Southington; Joseph F. Rich, New Britain, all of Conn.

[73] Assignee: General Electric Company, New York, N.Y.

[21] Appl. No.: 970,411

[22] Filed: Dec. 18, 1978

[51] Int. Cl.² .................................................. H02B 9/00
[52] U.S. Cl. ..................................... 361/361; 361/365; 361/374
[58] Field of Search ............... 361/331, 346, 353, 355, 361/356, 358, 361, 363–365, 369, 372, 374, 375; 200/51 R

[56] References Cited

U.S. PATENT DOCUMENTS 3,707,653 12/1972 Coffey ................................. 361/365
4,093,970 6/1978 M'Sadoques ........................ 361/361
4,117,530 9/1978 Reed .................................... 361/365

Primary Examiner—Gerald P. Tolin
Attorney, Agent, or Firm—Robert A. Cahill; Walter C. Bernkopf; Philip L. Schlamp

[57] ABSTRACT

A multiple metering panelboard has an enclosure accommodating a plurality of watt-hour meter sections. Each section includes a molded plastic meter socket base and a molded plastic circuit breaker base mounted in interconnected relation to the enclosure in overlying relation to an array of busbars common to all meter sections of the assembly. The socket base of each section includes means for positioning at appropriate locations within the meter socket a plurality of jaws which are supported against meter insertion forces by rigid straps respectively electrically connecting the jaws to the underlying busbars and to circuit breaker line stabs mounted by the breaker base.

7 Claims, 6 Drawing Figures

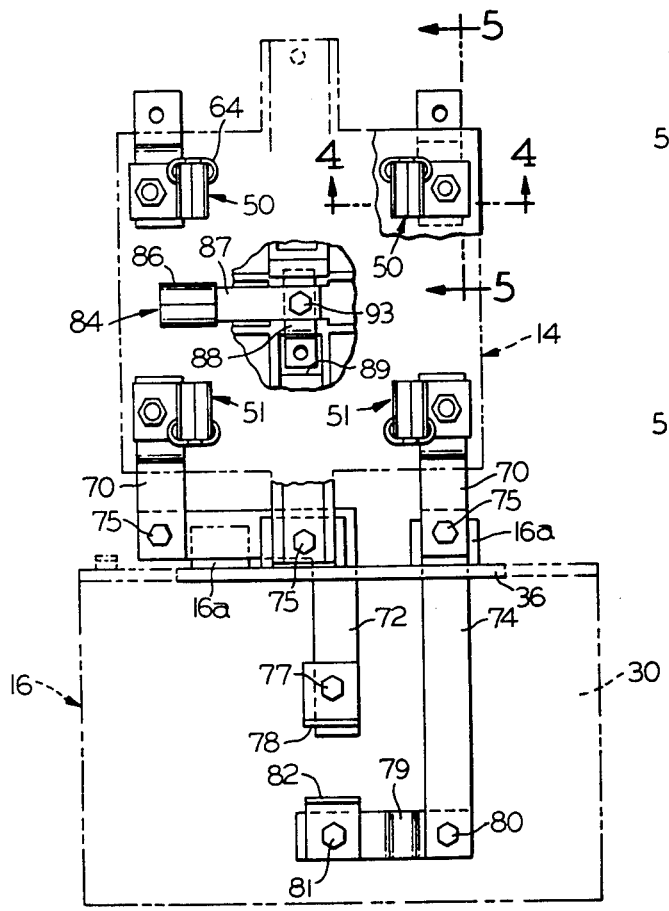
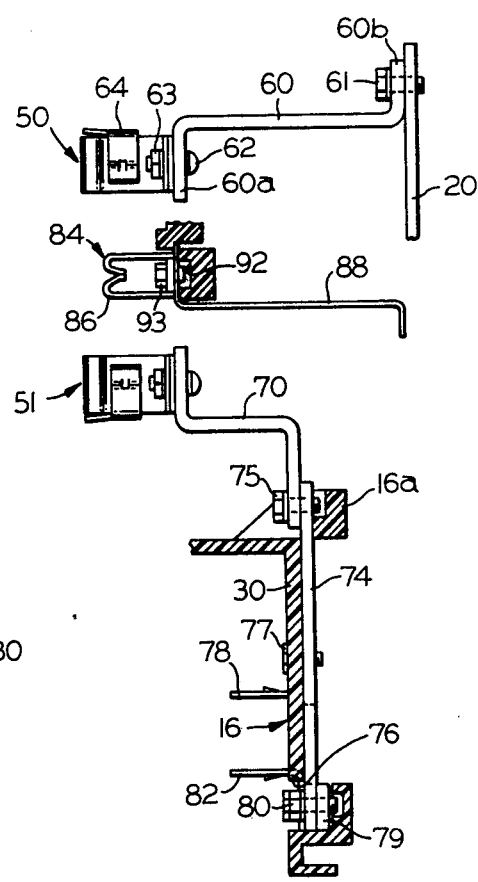
FIG.2    FIG.3
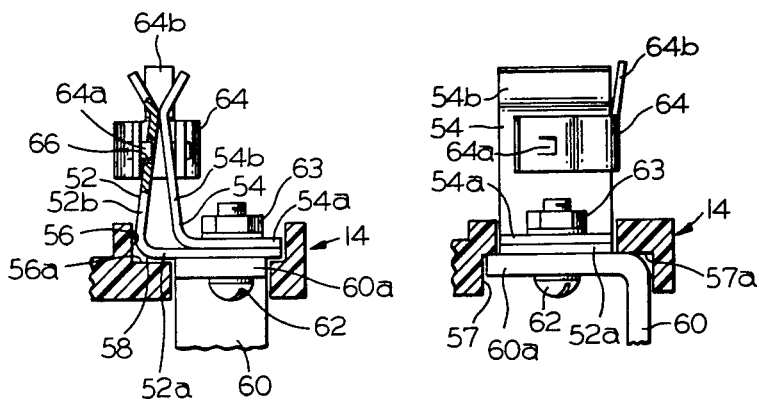
FIG.4    FIG.5 ial separately front assembled and disassembled in accordance with an important feature of the present invention to facilitate factory assembly and field servicing.

MULTIPLE METERING PANELBOARD ASSEMBLY

BACKGROUND OF THE INVENTION

The present invention relates to improvements in multiple metering panelboards as are commonly utilized in apartment buildings and the like.

In an effort to cost improve multiple metering panelboards, manufacturers have resorted to molded plastic meter socket bases. It has been found that a molded meter socket base, when called upon to mount the meter socket jaws, has only marginal strength in withstanding the forces attending the insertion of a watt-hour meter. Consequently, these molded bases sometimes crack upon insertion of a meter and must therefore be replaced, often in the field. With typical prior art constructions, this is not a convenient procedure.

Moreover, prior art multiple metering panelboard constructions do not lend to ease of assembly in the factory nor convenient installation and servicing in the field.

It is accordingly an object of the present invention to provide an improved multiple metering panelboard assembly.

An additional object of the present invention is to provide a multiple metering panelboard assembly of the above character wherein the withstandability of the meter sockets to watt-hour meter insertion is significantly improved in an efficient and practical manner.

A further object is to provide a multiple metering panelboard assembly of the above character, wherein factory assembly and field servicing is greatly simplified.

Another object is to provide a multiple metering panelboard assembly of the above character, wherein meter insertion is facilitated.

Yet another object is to provide a multiple metering panelboard assembly of the above character which is inexpensive to manufacture and convenient to install.

Other objects of the invention will in part be obvious and in part appear hereinafter.

SUMMARY OF THE INVENTION

In accordance with the present invention, there is provided a multiple metering panelboard assembly having an enclosure accommodating a plurality of watt-hour meter sections. Each section includes a molded plastic meter socket base and a molded plastic circuit breaker base mounted in interconnected relation to the enclosure in overlying relation to an array of busbars common to all meter sections of the assembly. The socket base of each section includes means for positioning at appropriate locations within the meter socket a plurality of jaws which are supported against meter insertion forces by rigid straps respectively electrically connecting the jaws to the underlying busbars and to circuit breaker line stabs mounted by the breaker base.

A removable L-shaped barrier is equipped to interlocking fit with the circuit breaker base and to be fastened to the enclosure for isolating two sides of each meter socket from the enclosure interior. An upstanding barrier wall integrally formed with the circuit breaker base and a portion of one enclosure sidewall cooperated with the L-shaped barrier in providing complete meter socket isolation.

The meter socket and circuit breaker bases, jaws, straps, L-shaped barrier, etc. of each meter section are The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 2 is a plan view, partially in phantom and partially broken away, of a portion of the assembly of FIG. 1;

FIG. 3 is a fragmentary side elevational view of that portion of the assembly seen in FIG. 2;

FIG. 4 is a fragmentary sectional view taken along line 4—4 of FIG. 2;

FIG. 5 is a fragmentary sectional view taken along line 5—5 of FIG. 2; and

Like reference numerals refer to corresponding parts throughout the several views of the drawings.

DETAILED DESCRIPTION

Figure 1:
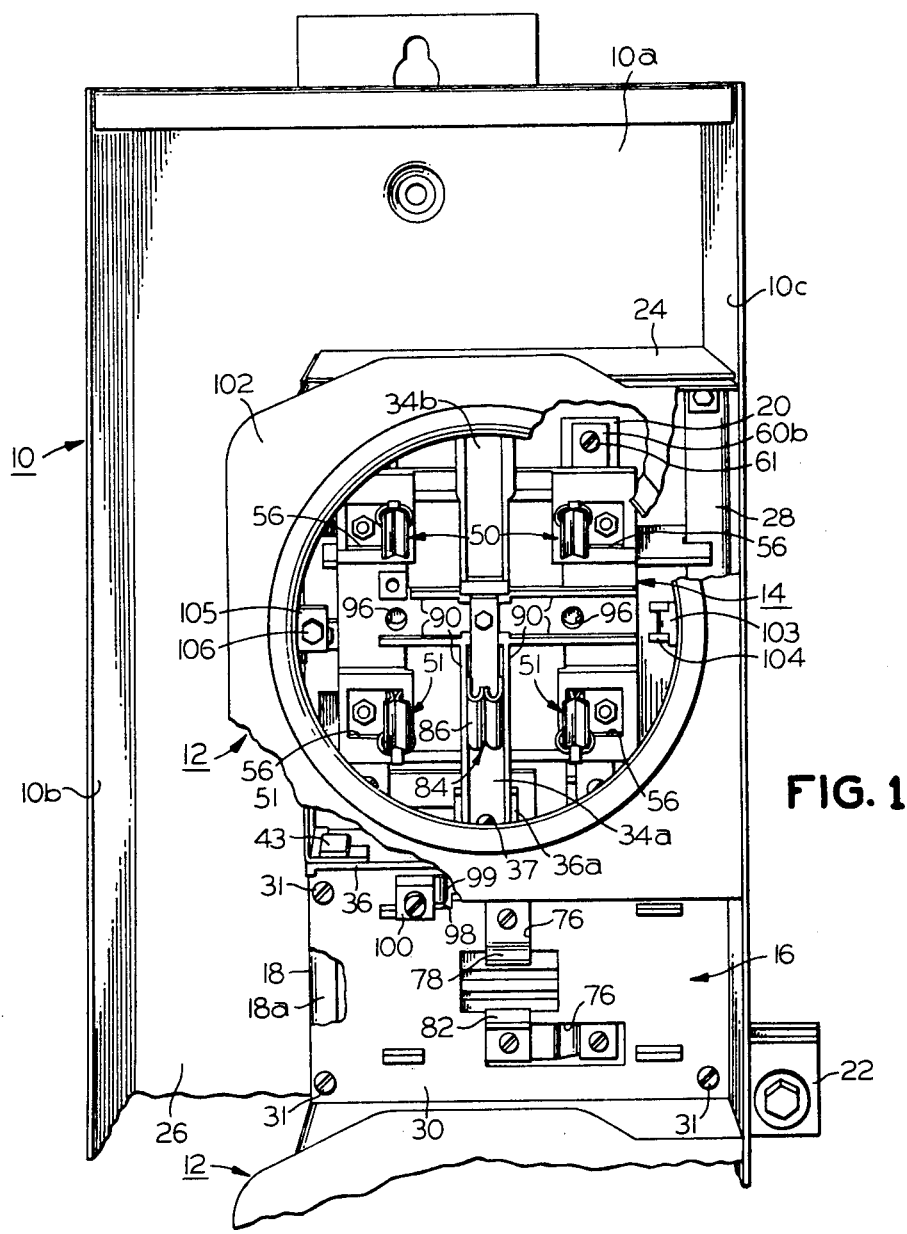
FIG. 1 is a front perspective view, partially broken away, of a multiple metering panelboard assembly constructed in accordance with the present invention.

The multiple metering panelboard assembly of the present invention includes, as seen in FIG. 1, a vertically elongated enclosure, generally indicated at 10, for accommodating a plurality of meter sections, generally indicated at 12, of which only the uppermost meter section is shown in its entirety. It will be appreciated that the meter sections vertically arrayed beneath the illustrated uppermost one are identically constructed. Thus, each meter section 12 includes a molded plastic meter socket base, generally indicated at 14, and a molded plastic circuit breaker base, generally indicated at 16. Affixed to the enclosure backwall 10a in spaced relation to the enclosure left sidewall 10b is an outstanding, vertically elongated, short barrier wall 18 which is common to all meter sections. This barrier wall cooperates with the right enclosure sidewall 10c in defining a vertically elongated channel in which is mounted a vertical array of busbars, one seen at 20 in FIGS. 1 and 3, for commonly electrically feeding the individual meter sections 12. These vertical busbars are in turn fed by horizontal busbars (not shown) via busbar connectors, one seen at 22 in FIG. 1, extending through suitable insulated openings in enclosure sidewall 10c. The vertical bus channel is terminated at its upper end by a transverse barrier wall 24 and at its lower end by a corresponding transverse barrier wall (not shown). Intermediate barrier wall 18 also cooperates with the left enclosure sidewall to define a trough 26 for accommodating branch circuit wiring.

Intermediate barrier wall 18 has a laterally turned upper edge portion 18a which cooperates with a coextensive ledge 28 affixed to closure sidewall 10c in supporting the bottom portion 30 of circuit breaker base 16 in overlying relation with the busbars 20. Screws 31 pass through holes in the circuit breaker base bottom portion 30 and thread through ledge 28 and barrier wall portion 18a pursuant to securing the circuit breaker base in place. Meter socket base 14 is provided with a downwardly extending projection 34a which rests on a ledge 36a integrally formed with outstanding barrier wall portion 36 of circuit breaker base 16. This wall portion is molded with bottom portion 30 to give circuit breaker base 16 an L-shaped configuration. A screw 37 secures projections 34a to ledge 36a pursuant to establishing the appropriate positional relationship between meter socket base 14 and circuit breaker base 16.

Figure 6:
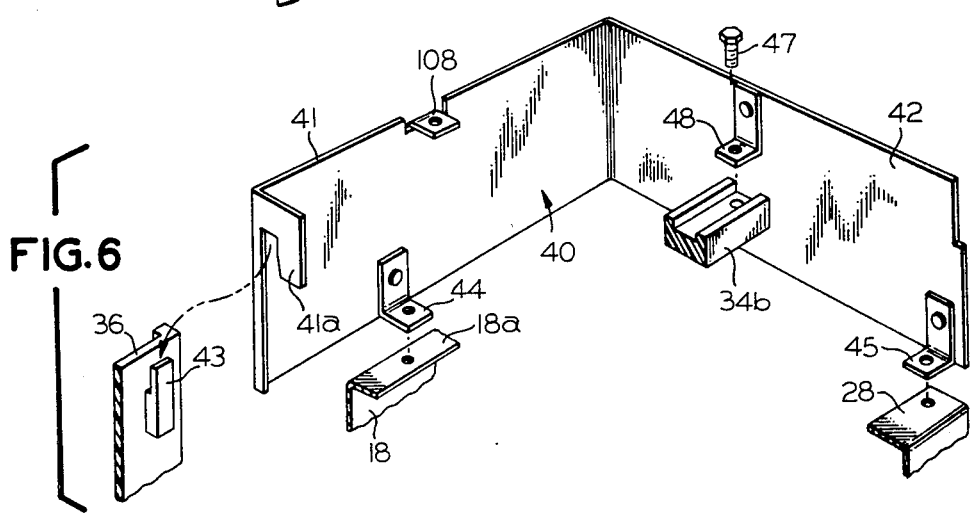
FIG. 6 is a fragmentary perspective view of an L-shaped barrier affixed in isolating relation with each meter socket of the assembly of FIG. 1.

As best seen in FIG. 6, an L-shaped metal barrier wall, generally indicated at 40, includes a vertically extending portion 41 and a horizontally extending portion 42 which serve in conjunction with wall portion 36 of circuit breaker base 16 and enclosure sidewall 10c to isolate the meter socket from the remainder of the enclosure interior. The lower end of wall portion 41 is provided with a laterally turned hook 41a which is adapted to engage a lug 43 integrally formed with wall portion 36 of circuit breaker base 16. A first L-shaped bracket 44, affixed to wall portion 41, accommodates a screw (not shown) which threadingly engages the barrier wall portion 18a. A second L-shaped bracket 45, carried by wall portion 42, likewise accommodates a screw which threadingly engages ledge 28 pursuant to securing L-shaped barrier 40 in place. An upwardly extending projection 34b of meter socket base 14 receives a screw 47 passing through a third L-shaped bracket 48, carried by wall portion 42 of L-shaped barrier 40, to further positionally locate meter socket base 14 within each meter section 12.

As seen in FIGS. 1 and 2, meter section 12 is equipped with a pair of line side jaws, generally indicated at 50, and a pair of load side jaws, generally indicated at 51. As best seen in FIGS. 4 and 5, these jaws are identically constructed from a pair of L-shaped conductive strips 52 and 54, each having respective base portions 52a and 54a and respective contact portions 52b and 54b. The base portions of these strips are seated one atop the other in one of plural rectangular cavities 56 molded into the front surface of meter socket base 14. Each of these cavities is intersected by a rectangular cavity 57 (FIG. 5) formed in the rear surface of meter socket base 14, and in which is accommodated, in the case of the line side jaws 50, the laterally turned upper end portion 60a of a rigid, electrically conductive, line strap 60. The bottom surface 57a of each cavity 57 (FIG. 5) is located slightly forwardly of the bottom surface 56a of its associated cavity 56 (FIG. 4) such that, at their intersection, they are in open communication with each other. It is thus seen that, by virtue of this construction, the forward surface of line strap end portion 60a is disposed forwardly of the bottom surface 56a of cavity 56, creating the clearance 58 seen in FIG. 4.

As seen in FIG. 3, strap 60 has a laterally turned lower end portion 60b which rests on one of the vertical busbars 20 and is clamped in electrical connection therewith by a bolt 61 threaded into the busbar. The upper laterally turned end portion 60a of each line strap 60 is provided with a tapped bore in which is preassembled a bolt 62 with its threaded shank held in upward extension into associated cavity 56. The bases of 52a and 54a of contact strips 52 and 54 are provided with registered holes accommodating the extension therethrough of the threaded shank of bolt 62 when the contact strips of the jaws 50 are seated in their associated cavities 56. Nuts 63 are then threaded down on the shanks of bolts 62 pursuant to clamping the contact strips of the line side jaws 50 in electrical connection with their respective line straps 60.

From this construction, it is seen that the line side jaws are mounted by the rigid line straps 60, rather than by the meter socket base 14, and consequently the stresses accompanying meter insertion are borne largely by the straps, not by the meter socket base which merely serves to positionally locate the jaws incident to assembly.

To provide the jaws with the requisite contact pressure, a generally C-shaped spring 64 is mounted to the jaws with its opposed arms acting on the contact portions 52b, 54b of strips 52, 54. To retain the springs in place, each spring arm is provided with an inwardly lanced portion 64a which catch in openings, one seen at 66 in FIG. 4, provided in each of the contact portions 52b, 54b. Each spring 64 is integrally provided with an outwardly extending guide tab 64b arranged transversely of the strip contact portions. These guide tabs serve to guide the meter stabs during their insertion between the strip contact portions of the jaws 50 and 51. As is common practice, the upper ends of the strip contact portions of the jaws are flared outwardly away from each other so as to further facilitate meter stab insertion.

The load side meter jaws 51 are likewise accommodated in separate cavities 56 formed in meter socket base 14 and are supported by and electrically connected to the laterally turned upper ends of separate load straps 70 (FIGS. 2 and 3) accommodated in cavities 57 in the same fashion as the line side meter jaws 50. These load straps extend downwardly and rearwardly to present their laterally turned lower ends in respective overlapping relation with the terminations of a rigid, L-shaped conductive strap 72 and a rigid straight strap 74 located immediately above circuit breaker base 16. The respective joints between these strap terminations are perfected by bolts 75 threadedly engaging the exposed terminations of straps 72, 74. These straps 72, 74 extend downwardly, running beneath floor portion 30 of the breaker base to terminations exposed in separate open bottom cavities, one seen at 76 in FIG. 3, formed in breaker base 16. The circuit breaker base is integrally formed with reinforced ledges 16a (FIGS. 2 and 3) which lend support to the load straps and load side jaws in withstanding meter insertion. In the case of strap 72, its exposed lower termination is threadedly engaged by a bolt 77 clamping the base portion of an L-shaped breaker stab 78 in electrical connection therewith. In the case of strap 74, its exposed lower termination, seen in FIG. 3, overlaps the termination of a conductive spacer strap 79 which is threadedly engaged by a bolt 80 to perfect an electrical joint therebetween. The other termination of strap 79 is threadedly engaged by a bolt 81 to clamp the base portion of an L-shaped breaker stab 82 in electrical connection therewith.

It will be understood that these stab terminals facilitate installation and electrical connection of a plug-in two pole circuit breaker (not shown). A load terminal end of the breaker faces wiring trough 26 through which branch circuit wiring is run for electrical connection to the breaker load terminals.

When the watt-hour meter is equipped with a neutral stab, the meter socket is equipped with a neutral jaw subassembly, generally indicated at 84 in FIGS. 1 through 3. This subassembly includes a meter jaw 86 which is bolted to one end of a spacer strap 87, whose other end is clamped in electrical connection with the laterally turned upper end of a neutral strap 88. The laterally turned rearward end of this neutral strap is clamped in electrical connection with a neutral busbar (not shown) located in the busbar channel intermediate the two line bus 20. This connection is likewise made using a bolt threadedly engaging the neutral busbar. The rearward extension of neutral strap 88 is accommodated through an opening 89 (FIG. 2) in the meter socket base. Surface ribs 90 (FIG. 1) formed on the meter socket base 14 serve to optionally positionally locate the neutral jaw at either the three, six or nine o'clock positions. A centrally located depression 92 (FIG. 3) formed in the meter socket base provides clearance for the swaged tapped hole formed in the neutral strap in which bolt 93 is threadingly engaged pursuant to clamping spacer strap 87 to neutral strap 88. Depressions 96 in the meter socket base 14, as seen in FIG. 1, accommodate the head of the bolt (not shown) used in clamping the neutral jaw 86 to the other end of spacer strap 87.

Circuit breaker base 16, seen in FIG. 1, is provided with an opening 98 accommodating the rearward extension of a neutral strap 99 having a neutral lug 100 clamped in electrical engagement to its laterally turned upper end and in turn clamped at its rearward end in electrical contacting engagement with the neutral bus (not shown).

As seen in FIG. 1, the frontal portion of the meter socket is defined by a ring cover 102. A catch 103 carried by the ring cover pivotally engages a latch 104 carried by the right enclosure sidewall 10c, and a bracket 105 accepts a bolt 106 which threadingly engages a laterally turned tab 108 carried by sidewall portion 41 of L-shaped barrier 40 pursuant to securing the ring cover in place. While not shown, it will be appreciated that the multiple metering panelboard assembly includes a cover suitably apertured to provide clearance for the ring covers when the cover is secured in closure relation with the open front of the enclosure 10.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A multiple metering panelboard assembly comprising, in combination:
   A. an enclosure having opposed sidewalls;
   B. a barrier wall mounted within said enclosure, said barrier wall defining with one enclosure sidewall a vertically elongated busbar channel and defining with the other enclosure sidewall a wiring trough:
   C. a plurality of vertical busbars positioned in said busbar channel; and
   D. a vertical array of individual meter sections, each said section including
      (1) a molded meter socket base mounted with said enclosure in overlying relation with said busbar channel,
      (2) a plurality of first cavities formed in the front surface of said meter socket base,
      (3) a plurality of second cavities formed in the rear surface of said meter socket base, each said second cavity intersecting a respective one of said first cavities, said intersecting first and second cavities being in open communication with each other, the bottom surface of each said second cavity being disposed forwardly of the bottom surface of its intersecting first cavity,
      (4) a line side jaw positioned in at least one of said first cavities,
      (5) a rigid, electrically conductive line strap having a laterally turned forward end portion disposed in the one of said second cavities intersecting said one first cavity and a laterally turned rearward end portion disposed in overlapping relation with one of said busbars,
      (6) first electrical joint effecting means including a first bolt threadingly engaging said one busbar to clamp said line strap rearward end portion in electrical connection with said one busbar, a second bolt threadingly engaging said line strap forward end portion to project its threaded shank forwardly into said one first cavity, and a nut threaded on said shank to clamp said line side jaw in electrical connection with said line strap forward end portion,
      (7) a molded circuit breaker base mounted in said enclosure in overlying relation with said busbar channel,
      (8) at least one stab terminal connector positioned in an open bottom cavity in said circuit breaker base,
      (9) a connector strap supported behind said circuit breaker base, said connector strap extending from a first termination clamped in electrical connection with said stab connector toward said meter socket base to a second termination exposed beyond said circuit breaker base,
      (10) a load side jaw positioned in at least one other of said meter socket base first cavities,
      (11) a rigid electrically conductive load strap having a laterally turned forward end portion disposed in the one of said second cavities intersecting said other first cavity and a laterally turned rearward end portion in disposed overlapping relation with said second termination of said connector strap, and
      (12) second electrical joint effecting means including a first bolt threadedly engaging said connector strap second termination to clamp said load strap rearward end portion in electrical connection therewith, a second bolt threadedly engaging said load strap forward end portion to project its threaded shank forwardly into said other first cavity, and a nut threaded on said shank to clamp said load side jaw in electrical connection with said load strap forward end portion.

2. The multiple metering panelboard assembly defined in claim 1, wherein said circuit breaker base is L-shaped having a bottom wall portion and an outstanding barrier wall portion disposed adjacent said meter socket base, said stab terminal connector positioned in said open bottom cavity in said bottom wall portion, and said connector strap is supported beneath said bottom wall portion.

3. The multiple metering panelboard assembly defined in claim 2, which further includes an L-shaped barrier wall mounted to said enclosure, said L-shaped barrier wall cooperating with said one enclosure sidewall and said circuit breaker base barrier wall portion in providing isolation for said line side and load side jaws.

4. The multiple metering panelboard assembly defined in claim 3, wherein said meter socket base is integrally formed having a first projection extending toward said barrier wall portion of said circuit breaker base, said first projection and said barrier wall portion including means accommodating a bolt fastening said meter socket base and said circuit breaker base together, and said meter socket base is integrally formed having a second projection extending away from said circuit breaker base, said second projection and said L-shaped barrier wall including means accommodating a bolt fastening said meter socket base and said L-shaped barrier wall together.

5. The multiple metering panelboard assembly defined in claim 4, wherein said L-shaped barrier is formed with a laterally turned hook portion at one termination thereof, said hook portion engaging a lug portion integrally formed with said circuit breaker base barrier wall portion.

6. The multiple metering panelboard assembly defined in claim 1, which includes a pair of line side jaws respectively connected by separate line straps to different busbars accommodated in said busbar channel, and a pair of load side jaws respectively connected by separate load straps and connector straps to separate stab connectors of said circuit breaker base.

7. The multiple metering panelboard assembly defined in claim 6, wherein said meter sections each includes a neutral jaw subassembly having a neutral jaw, a neutral strap, and an electrically interconnecting spacer strap, and said meter socket base having frontal surface formations accommodating selective positioning of said neutral jaw and an aperture accommodating the rearward extension of said neutral strap for the various positions of said neutral jaw.

* * * * *